US012635695B2

(12) United States Patent
Kumar

(10) Patent No.: US 12,635,695 B2
(45) Date of Patent: May 26, 2026

(54) ORGANIC FUNGICIDE

(71) Applicant: Ecolution.Ag LLC, Temple Terrace, FL (US)

(72) Inventor: Albert Santosh Kumar, Bangalore (IN)

(73) Assignee: Ecolution.Ag LLC, Temple Terrace, FL (US)

( * ) Notice: Subject to any disclaimer, the term of this patent is extended or adjusted under 35 U.S.C. 154(b) by 0 days.

(21) Appl. No.: 18/006,701

(22) PCT Filed: Mar. 19, 2021

(86) PCT No.: PCT/US2021/023242
§ 371 (c)(1),
(2) Date: Jan. 24, 2023

(87) PCT Pub. No.: WO2022/025990
PCT Pub. Date: Feb. 3, 2022

(65) Prior Publication Data
US 2023/0270121 A1 Aug. 31, 2023

(30) Foreign Application Priority Data
Jul. 31, 2020 (CA) ..................................... 3088670

(51) Int. Cl.
| | |
|---|---|
| *A01N 65/20* | (2009.01) |
| *A01N 25/02* | (2006.01) |
| *A01N 25/30* | (2006.01) |
| *A01N 65/40* | (2009.01) |
| *A01N 65/42* | (2009.01) |
| *A01P 3/00* | (2006.01) |

(52) U.S. Cl.
CPC ............. *A01N 65/20* (2013.01); *A01N 25/02* (2013.01); *A01N 25/30* (2013.01); *A01N 65/40* (2013.01); *A01N 65/42* (2013.01); *A01P 3/00* (2021.08)

(58) Field of Classification Search
None
See application file for complete search history.

(56) References Cited

U.S. PATENT DOCUMENTS

| | | |
|---|---|---|
| 2005/0266036 A1 | 12/2005 | Awada et al. |
| 2016/0186273 A1 | 6/2016 | Taghavi et al. |
| 2018/0310570 A1 | 11/2018 | Castellón Mora et al. |

FOREIGN PATENT DOCUMENTS

| | | | | |
|---|---|---|---|---|
| WO | WO 2006/012715 | * | 2/2006 | ............... A61K 7/32 |
| WO | 2019/123483 A1 | | 6/2019 | |
| WO | 2019/195948 A1 | | 10/2019 | |
| WO | 2020/160536 A1 | | 8/2020 | |

OTHER PUBLICATIONS

Ara et al (Can J Microbiol 52:357-364, 2006) (Year: 2006).*
Saddiq et al (Pak J Pharm Sci 31:2123-2130, 2018) (Year: 2018).*
Jiang et al (Mediators of Inflammation 2016(1):2945650, 2016) (Year: 2016).*
Popova-Krumova et al (Microorganisms 12:739 (18 pp), 2024) (Year: 2024).*
Jiang et al., Evaluation of the Antioxidative, Antibacterial, and Anti-Inflammatory Effects of the Aloe Fermentation Superatant Containing Lactobacillus plantarum HM2187 49.1, Mediators of Inflammation, vol. 2016, 2016 [retrieved on May 19, 2021]. Retrieved from the Internet: <URL: https://www.hindawi.com/journals/mi/2016/2945650/>. Pgs. 1-8.
International Search Report and Written Opinion in International No. PCT/US21/23242, mailed on Jun. 29, 2021, 18 pages.
International Preliminary Report on Patentability in International No. PCT/US21/23242, mailed on Feb. 9, 2023, 10 pages.

* cited by examiner

*Primary Examiner* — Craig D Ricci
(74) *Attorney, Agent, or Firm* — Berg Hill Greenleaf Ruscitti LLP

(57) ABSTRACT
A method is provided for the prevention, treatment and/or management of the black sigatoka on plants prone to such fungus. In a preferred embodiment the method comprises the steps of providing a fungicidal composition comprising karanj oil; applying the composition on the plants; wherein the step of applying is repeated as necessary and can be done until a day before harvest. In another preferred embodiment the invention comprises an aqueous fungicidal composition comprising karanj oil. The composition may further include fermented aloe vera extracts, a natural surfactant, and/or water as a solvent.

1 Claim, No Drawings

ORGANIC FUNGICIDE

CROSS REFERENCE TO RELATED APPLICATION

This application is a national stage application under 35 U.S.C. 371 of PCT Application No. PCT/US2021/023242 having an international filing date of Mar. 19, 2021, which designated the United States, which PCT application claimed the benefit of Canadian Serial No. 3,088,670, filed Jul. 31, 2020, both of which are incorporated by reference in their entireties.

FIELD OF THE INVENTION

The present invention is a novel agricultural input created to treat fungal diseases and more specifically, to the treatment or management of black sigatoka and yellow sigatoka

BACKGROUND OF THE INVENTION

Black Sigatoka also known as "Black leaf streak" and Yellow Sigatoka is also known as "Sigatoka leaf spot", are both serious diseases of banana for which there is no known organic product which can manage the disease. Black and Yellow Sigatoka occur in all banana growing regions in the world, Asia, Australia, South America, Central America and African countries the disease spreads mainly because of high humidity and rainy conditions which favor the fast spread of disease in banana. The black sigatoka was first identified in the 1960's in Mexico but has since then spread to central and south America, the Caribbeans Asia and recently in Florida in the late 1990's. The yellow sigatoka was first recorded on the Indonesian island of Java by Zimmermann in 1902.

The fungal pathogen *Mycosphaerella fifiensis* (Black Sigatoka) cause streaks that run parallel to the leaves and the other fungal pathogen *Pseudocercospora musicola* (Yellow Sigatoka) causes pale yellow streaks and elliptic necrotic spots. These pathogen thrives in hot and humid conditions. Rainfall helps the fungus spread over large fields. Without management and control of the fungus infects mature banana leaves and will continue to do so until the leaves are all infected and thereby reduces leaf's photosynthetic activity which in turn affects bunch size and it also shortens the fruits green life, the time between harvest and ripening.

Initially, the fungus shows up as brownish-red specks on the leaves. As the fungus grows and spreads it becomes more visible on the undersides of the banana leaf. Over time, the lesions become darker and cause a depression on the leaf. The depressions eventually grow and merge together and destroy the leaf and its ability to perform photosynthesis which ultimately lead to the death of the tree.

Currently, several methods are employed to control black Sigatoka. One of those involves the removal and destruction of the leaves infected by the fungus. This helps in reducing the initial and secondary spread of the disease. Another way of control the disease spread is by improving the drainage and irrigation around the trees. Maintaining the environment around the trees at low humidity allows to minimize the spread to neighboring plants via the water on the ground. Other reported techniques include the practice of multi-cropping, mixing banana with other trees or vegetation.

While practicing multi-cropping may seem desirable it is likely not feasible in plantation where the target plant is of a specific kind, as this would not be an efficient method of large scale cultivation.

The application of synthetic fungicides is perhaps the most common form of chemical control of the fungus. This is a preemptive control used on banana trees in order to protect them from primary inoculum. The fungicide does not kill the pathogen itself, but works on the pre-necrotic spots on the leaves, stopping the secondary spores from spreading to healthy plant tissue. The best time to apply this protective fungicide is at the beginning of the growing season in order to minimize the possibility of an initial infection. However, to manage this disease one needs to spray every 7 days. This use of synthetic chemicals leads toan accumulation in the surrounding fragile ecosystem. Excessive use of chemical fungicides leads to contamination of waterways, as well as human and animal populations exposure. Exposure to these synthetic fungicides can cause irreparable damage. Currently, the most common chemical fungicides used as contact fungicides are Chlorotalonil (Benzene derivatives), Mancozeb (Carbamates). The systemic fungicides used are classified by the chemical structures. These include: benzimidazoles; quinone outside inhibitors; demethylation inhibitors and N-phenylcarbamates. The demethylation inhibitors are effective but should be alternated with compounds having other modes of action in order to avoid the development of resistance by the plants treated.

Prior to treatment by chemical fungicides it is desirable that infected leaves be removed in order to increase the possibility of tree survival. Although fungicides have improved over the years, the pathogen has been shown to have developed some resistance. This in turn requires a more frequent use the synthetic fungicide and increases the impact on the environment and consequently on the health of workers in the industry, especially those handling the chemicals.

Other means of overcoming the disease is by the introduction of modified gene cultivars of bananas which are resistant to the disease.

In light of the prior art, there exists a clear need for a fungicide which does not have the drawbacks of currently available fungicides to help in the fight against black sigatoka. Bananas are clearly a crop of significant importance for most of the world. Its significance is even greater in countries where they are grown and they form part of the staples of the diet of the population. Such a widespread and difficult to control fungus has an immediate and critical impact on those people and as such a better method to control this fungus is required and long overdue.

SUMMARY OF THE INVENTION

According to an aspect of the present invention, there is provided a novel organic fungicide comprising a plant extract which has the ability to prevent, reduce or eliminate the appearance, growth or spread of black sigatoka.

According to a first aspect of the present invention, there is provided an aqueous fungicidal composition comprising Karanj oil.

According to another aspect of the present invention, there is provided an aqueous fungicidal composition comprising Karanj oil and fermented aloe vera extracts.

According to another aspect of the present invention, there is provided an aqueous fungicidal composition comprising Karanj oil; fermented aloe vera extracts and a natural surfactant.

According to a preferred embodiment of the present invention, there is provided an organic fungicidal composition comprising Karanjin. Preferably, the composition further comprises a surfactant, such as hibiscus leaf extract.

Preferably, the composition further comprises fermented extracts of aloe vera. Preferably, the composition further comprises water as a solvent.

The inventors have unexpectedly found that a composition comprising karanj oil, hibiscus leaf extract and fermented extracts of aloe vera provided surprising control and management of the black sigatoka on banana tree leaves. In fact, upon testing a composition according to a preferred embodiment of the present invention it was determined that 95% of the trees had no traces of black sigatoka fungus on their leaves. The advantages of such a composition are substantial given the increasing environmental regulations prohibiting or severely limiting the use of synthetic fungicides such as those mentioned previously. Not only are synthetic fungicides inherently dangerous when it comes to consumption but they also pose a great threat to waterways as well as the soil on which they end up. In certain countries, regulations do not permit the use of synthetic fungicides within 60 feet of any roadways and in some cases also 60 feet from any waterway. When taking this into account there is a clear disadvantage for even a small farmer of utilizing such pesticides as the restrictions prevent the cultivation of large tracts of land.

Because the compositions according to a preferred embodiment of the present invention, are not synthesized by man, such environmental restrictions do not apply. In fact, the natural origination of the components of a preferred embodiment of the present invention allow it to be used in substantially all of the possible cultivation areas in the world. Moreover, as it does not fall under the definition of synthetic fungicide, the use thereof would allow the cultivation of plants beyond the 60-foot limit enacted by regulations. Hence, plants can be cultivated closer to roads and waterways without negatively impacting the environment as all the components are naturally sourced.

Karanjin is a furanoflavonol, a type of flavonoid obtained from the seeds of the karanja tree, a wild tree native to southern India. It is widespread and is an important source of bio-fuel as a substitute for diesel and to run power grid systems to run water pumps. Karanja is known as a herbal medicine mostly used for the treatment of skin diseases. According to a preferred embodiment of the present invention, karanjin is present in an amount ranging from 1 to 5 wt % of the total weight of the composition. Preferably, it is present in an amount ranging from 1 to 3 wt % and even more preferably, from 1 to 2 wt %. A most preferred composition comprises karanjin at 1.37 wt %.

Fermented extracts of aloe vera can be obtained by fermenting the flesh of the plant. This yields among other compounds, lactic acid bacteria (LAB) which have antimicrobial activity. According to a preferred embodiment of the present invention, the combination of karanj oil and fermented extracts of aloe vera yields a potentiated fungicidal composition which has a particular affinity for the reduction, control, management and/or eradication of black sigatoka fungus. Hence, applying a preferred composition of the present invention to banana tree leaves would help in eliminating or at least substantially minimizing the presence of such fungus. In large monoculture farms, this composition would represent a number of advantages. It would eliminate the need to monitor water discharges of synthetic fungicides, as it is made with natural products. It also allows to use a greater part of the potential arable surface area as it is not affected by the environmental restrictions applicable to synthetic fungicides. Advantageously, as the composition according to a preferred embodiment of the present invention is an organic formulations, it does not leave any residue.

After eliminating the fungus in question, the composition's components break down into water, oxygen and carbon dioxide and, as such, makes it the best organic fungicide available. Additionally, a preferred embodiment of the present invention has exhibited natural growth enhancing effect by increasing the overall growth of the plant with more pronounced effect seen on the leaves in terms of increased width as well as in length.

According to a preferred embodiment of the present invention, the surfactant is a naturally occurring surfactant. Preferably, it is a hibiscus leaf extract. The hibiscus leaf extracts has natural surfactants in the form of saponins which act as surfactants to the organic formulation by way of reducing surface tension which enables the product to spread on the leaf surface and make the active ingredient available to act the fungus efficiently.

Other naturally occurring compounds deemed to be suitable alternative for hibiscus include soap nuts. Other natural surfactants considered within the scope of the present invention include: coco glucoside, as well as decyl glucoside both derived from natural sources.

According to a preferred embodiment of the present invention, there is provided an organic composition to manage the Black and/or Yellow Sigatoka effectively. It works on fungal diseases particular to banana trees but also works on other plant fungal diseases too.

According to another preferred embodiment of the present invention, there is provided an organic fungicide with natural growth promoting effect on plants.

According to a preferred embodiment of the present invention, there is provided a composition comprising plant extracts and plant oils as per the following (in wt %):

Karanj oil—1.27% (1 to 5%) Karanjin content in Karanj Oil is 0.002%

Hibiscus leaf extract 38%—(30 to 40%)

Aloe vera extracts (fermented) 56.9% (40 to 60%)

Water 3.83% (3 to 5%)

According to another aspect of the present invention, there is provided a food product classified as 'clean food' grown in the presence of an aqueous fungicidal composition comprising Karanj oil. Preferably, the composition further comprises fermented aloe vera extracts. Preferably, the composition further comprises fermented aloe vera extracts and a natural surfactant. More preferably, the Karanj oil is present in an amount ranging from 1 to 5 wt % of the total weight of the composition. More preferably, the fermented aloe vera extracts are present in an amount ranging from 40 to 60 wt % of the total weight of the composition. More preferably, the natural surfactant is present in an amount ranging from 30 to 60 wt % of the total weight of the composition. Even more preferably, the natural surfactant is present in an amount ranging from 35 to 45 wt % of the total weight of the composition.

According to another aspect of the present invention, there is provided a food product classified as 'residue-free' grown in the presence of an aqueous fungicidal composition comprising Karanj oil. Preferably, the composition further comprises fermented aloe vera extracts. Preferably, the composition further comprises fermented aloe vera extracts and a natural surfactant. More preferably, the Karanj oil is present in an amount ranging from 1 to 5 wt % of the total weight of the composition. More preferably, the fermented aloe vera extracts are present in an amount ranging from 40 to 60 wt % of the total weight of the composition. More preferably, the natural surfactant is present in an amount ranging from 30 to 60 wt % of the total weight of the composition. Even more preferably, the natural surfactant is present in an amount ranging from 35 to 45 wt % of the total weight of the composition.

According to another aspect of the present invention, there is provided a food product grown with an exposure to an aqueous fungicidal composition comprising Karanj oil. Preferably, the composition further comprises fermented aloe vera extracts. Preferably, the composition further comprises fermented aloe vera extracts and a natural surfactant. More preferably, the Karanj oil is present in an amount ranging from 1 to 5 wt % of the total weight of the composition. More preferably, the fermented aloe vera extracts are present in an amount ranging from 40 to 60 wt % of the total weight of the composition. More preferably, the natural surfactant is present in an amount ranging from 30 to 60 wt % of the total weight of the composition. Even more preferably, the natural surfactant is present in an amount ranging from 35 to 45 wt % of the total weight of the composition.

DESCRIPTION OF THE INVENTION

Organic food is defined by The Department for Agriculture and Rural Affairs (DEFRA) as: 'Organic food is the product of a farming system which avoids the use of man-made fertilisers, pesticides; growth regulators and livestock feed additives. Irradiation and the use of genetically modified organisms (GMOs) or products produced from or by GMOs are generally prohibited by organic legislation.'

Organic agriculture is similarly defined by DEFRA as: 'Organic agriculture is a systems approach to production that is working towards environmentally, socially and economically sustainable production. Instead, the agricultural systems rely on crop rotation, animal and plant manures, some hand weeding and biological pest control.'

The Clean Food Standard is a voluntary best-practice standard for food producers aimed at identifying fresh grown foods that meet exceptional standards of product purity. The standard extends the concept of purity embodied in national Clean Air and Clean Water regulations into the food arena. Specifically, the standard addresses four areas of potential concern: 1) pesticide residues, 2) food pathogens, 3) industrial contaminants and heavy metals; and 4) GMOs. The Clean Food Standard is intended to assist commercial, government and institutional buyers as well as consumers make better informed decisions about the fresh grown foods they purchase in terms of product purity considerations, thereby protecting the health and welfare of consumers by limiting their risk of exposure to potentially harmful residues and pathogens in the food supply. The Clean Food Standard is also intended to provide marketplace recognition to food producers who are voluntarily taking exceptional measures to protect the purity of the food they produce, thereby encouraging food producers to adopt pest management regimes, growing practices and food handling methods that minimize potential harm to human health and the environment from pesticide exposure, food pathogens, and other contaminants. Further, the Clean Food Standard is intended to serve as the basis for specific market claims, to be certified by recognized independent third parties who have no ownership or brokerage interest in the foods being certified, and who have no vested interest in the outcome of a given certification. The Clean Food Standard is also intended to define product purity requirements that can be used to inform the development of broader national standards for sustainable agricultural practices.

In light of the Clean Food Standards, the definition of a Clean Food is 'a fresh grown food product that complies with the requirements set forth in this Standard.'

The "limit of detection" (LOD) is the limit below which a laboratory cannot confirm the presence of a specific residue in a given commodity. For pesticides, LODs are established in accordance FDA PAM II protocols for pesticides. For heavy metals, LODs are established in accordance with EPA protocols for ICP-MS. For other industrial chemicals, LODs are established in accordance with EPA 600-series protocols. The purity requirements of a Clean Food include synthetic pesticides with US EPA tolerances. Therefore, a clean food product shall be shown to be free of pesticide residues based on LODs for all registered synthetic pesticides with established tolerances. For those crops that have a pulp-only tolerance (e.g., honeydew, cantaloupe, banana), or for those crops that are tested for edible portion only in accordance with FDA PAM II protocols (e.g., corn, avocado), only the edible portion shall be required to be free of pesticide residues, based on the laboratory LOD. By or before 2010, all LODs must, at a minimum, meet de minimus risk levels.

In Canada, the maximum residue limit for pesticides is assessed by considering that the residue definition upon which maximum residue limits (MRLs) are based typically includes the parent chemical and often includes corresponding metabolites. In some cases, a chemical may have multiple residue definitions, for example, between food crops and livestock commodities. The residue definition for all chemicals with established MRLs regulated under the Pest Control Products Act are listed in a table which reflects the content previously found in MRL listings under "Chemical Name of Substance". MRLs established in Canada may be found using the Maximum Residue Limit Database on the Maximum Residue Limits for Pesticides webpage. The database allows users to search for established MRLs, regulated under the Pest Control Products Act, both for pesticides or for food commodities. There are over 400 chemicals listed on the Canadian website which produce at least one metabolite which can be of concern upon consumption of a foodstuff containing such.

Bananas are never included in the list of the 'Dirty Dozen', the most pesticide and fungicide contaminated fruits and vegetables sold in stores. However, that is not to say that they are free of any synthetic chemicals, nor does it mean that farmers growing bananas are sheltered from the harmful effects of such chemicals.

While it is commonplace knowledge that pesticides are used to protect crops against insects, weeds, fungi and other pests. It is also commonplace knowledge that pesticides are potentially toxic to humans and can have both acute and chronic health effects, depending on the quantity and ways in which a person is exposed. Some of the older, cheaper pesticides can remain for years in soil and water. These chemicals have been banned from agricultural use in developed countries, but they are still used in many developing countries. The greatest dirty secret of pesticides and fungicides is that the people who face the greatest health risks from exposure to pesticides are those who come into contact with them at work, in their home or garden.

There are over 1000 known pesticides used around the world to protect food crops from damage or destruction by a variety of pests. Each pesticide has different properties and toxicological effects. The toxicity of a pesticide depends on its function and other factors. For example, insecticides tend to be more toxic to humans than herbicides. The same chemical can have different effects at different doses (how much of the chemical a person is exposed to). It can also depend on the route by which the exposure occurs (such as swallowing, inhaling, or direct contact with the skin).

What is less known is that pesticides are among the leading causes of death by self-poisoning, in particular in low- and middle-income countries. Because of their inherent toxicity and due to the fact that they are deliberately spread in the environment, the production, distribution, and use of pesticides require strict regulation and control. Regular monitoring of residues in food and the environment is also required. The most at-risk population are people who are directly exposed to pesticides. This includes agricultural workers who apply pesticides, and other people in the immediate area during and right after pesticides are spread. The general population—who are not in the area where pesticides are used—is exposed to significantly lower levels of pesticide residues through food and water.

Pesticides and fungicides can prevent large crop losses and will therefore continue to play a role in agriculture. However, the effects on humans and the environment of exposure to pesticides are a continuing concern.

It is critical that the use of synthetic chemicals in the assistance of food production be limited as much as possible so that the benefits not only outweigh the inherent risks associated with the use of such products but preferably should provide farmers and people handling such products with a much safer workplace environment (storage, handling, disposal, etc.) than is currently required by the extremely lax regulations in many countries. It is important to be reminded of the fact that the use of pesticides to produce food, both to feed local populations and for export, should comply with good agricultural practices regardless of the economic status of a country. As such, farmers should limit, both for their own safety but also because of their critical contribution to the food chain the amount of pesticide used to the minimum necessary to protect their crops.

It is also possible, under certain circumstances, to produce food without the use of synthetic pesticides. This is the ideal case, where the farmers can attend to their crops safely while being capable of producing large amounts of food both for their own families, for transactions in the local market as well as for exporting to other countries.

According to a preferred embodiment of the present invention, the composition is sprayed on the leaf surface and the fungal pathogens of Black or Yellow Sigatoka reside on the under surface of the leaves.

It is hypothesized by the inventors that the mode of action of a composition according to a preferred embodiment of the present invention is by preventing the formation of spores and eventually the spread of fungus is managed.

According to a preferred embodiment of the present invention, the use composition will produce a food product classified as 'clean food'.

According to a preferred embodiment of the present invention, the use composition will produce a food product classified as 'residue-free food' or 'residue-free product' or 'residue-free food product'.

According to a preferred embodiment of the present invention, the Karanj oil is present in an amount ranging from 1 to 5 wt. %. Preferably also, the fermented aloe vera extracts are present in an amount ranging from 40 to 60 wt. %. Preferably, the natural surfactant is present in an amount ranging from 30 to 60 wt. %. More preferably, the natural surfactant is present in an amount ranging from 35 to 45 wt %.

According to another aspect of the present invention, there is provided a use of the composition described herein for the treatment, prevention and/or management of black sigatoka.

According to another aspect of the present invention, there is provided a method for the prevention, treatment and/or management of the black sigatoka on plants prone to such fungus, said method comprising the steps of:

providing a fungicidal composition comprising karanj oil;

applying said composition on said plants;

wherein said step of applying is repeated as necessary and can be done until the day before harvest.

According to another aspect of the present invention, there is provided a method for the stimulation of the growth of a plant prone to the fungus black sigatoka, said method comprising the steps of:

providing a fungicidal composition comprising karanj oil;

applying said composition on said plants;

wherein said step of applying is repeated as necessary and can be done until the day before harvest. Preferably, said composition further comprises fermented aloe vera extracts. Preferably also, said composition further comprises a natural surfactant. Preferably also, said composition further comprises water as a solvent.

According to a preferred embodiment of the present invention, the composition has both anti-fungal properties and growth stimulating properties, which while increasing the growth of the plant and it has shown to increase the plant survival rate to almost 95%.

The economic impact caused by Black Sigatoka is very huge and it leads to 40% loss. The banana market is nearly 8 billion dollars and treating the disease costs almost 250 million dollars. The composition according to a preferred embodiment of the present invention, costs less than synthetic fungicides and has practically no after-market costs (no clean-up costs, no lawsuits because of toxicity unlike some synthetic products, no water discharge control measures necessary, greater proportion of the land can be used, etc.) Moreover, it manages the disease effectively and has an added advantage of accelerating the growth of banana tree plants. It has been reported that the use of a composition according to the present invention has increased the yield of each banana tree by up to 20-25% more bananas as well as providing larger bananas than untreated or plants treated with chemical pesticides.

Even organic bananas, which are grown using the organic guidelines can be treated with synthetic fungicide. The rules of application require covering the banana fruits with a bag and interrupting the spraying of the fungicide at least 14 days prior to the harvest. Moreover, it is important to note that despite the "organic" labelling the produce may still be exposed to synthetic fungicide (i.e. not even covered by a bag).

According to a preferred embodiment of the present invention, the application of a composition of the present invention would allow a farmer to apply said composition on the bananas without having to cover them in a plastic bag. This has a three-fold advantage, less workforce necessary to cover the banana plants, no usage of plastic bags and subsequent disposal thereof and maintaining a clean food labelling standard.

According to a preferred embodiment of the present invention, the application of a composition of the present invention would allow a farmer to have fewer dead banana tree leaves. Dead leaves due to infection from a fungi must be removed quickly to prevent the spreading of the fungal infections to other leaves and ultimately to the entire plant.

The fact that such a composition provides the farmer with such an outstanding performance against fungal infections would allow him to employ fewer people whose sole job is to walk up and down the banana grove and cutting off infected leaves.

According to a preferred embodiment of the present invention, the composition has no specific disadvantages in comparison to the synthetic fungicides being currently used. Nonetheless, it is preferable to take care when using the fungicide according to a preferred embodiment on plants by using appropriate eye protection and nose masks to prevent any potential damage.

Flesh Testing of Fungicide

Testing to determine the absorption of fungicide into the flesh of bananas was conducted in order to eventually determine whether a natural fungicide would avoid such drawback. Testing was conducted at the University of Guelph Agriculture and Food Laboratory in order to assess the pesticide and fungicide content of a variety of bananas obtained on the shelves of a Canadian supermarket.

Bananas obtained from six different sources (3 regulars and 3 organics) are labelled as #1 to #3 (for both regular and organic sources). The first series of testing involved assessing the content of ethylenebisdithiocarbamates (EBDC) in the flesh of the bananas purchased. Table #1 provides a summary of the results from the testing.

TABLE #1

Results of testing of banana flesh for presence of EBDC compounds

| Sample | Test | Results |
|---|---|---|
| Banana #1 | EBDC Screen | Detected (ethylenebisdithiocarbamates < MQL) |
| Banana #2 | EBDC Screen | Detected (ethylenebisdithiocarbamates < MQL) |
| Banana #3 | EBDC Screen | Not detected |
| Banana (organic #1) | EBDC Screen | Not detected |
| Banana (organic #2) | EBDC Screen | Not detected |
| Banana (organic #3) | EBDC Screen | Not detected |

EBDC's are measured as CS2 and reported as Zineb equivalent.
EBDC MDL = 0.03 ppm, MQL = 0.05 ppm The second series of testing by GC-MS/MS multiresidue screen (Method ID: TOPS-142) was done to assess the presence of pesticides (as well as their content and identity) in the flesh of the bananas purchased. Table #2 provides a summary of the results from the testing.

TABLE #2

Results of testing of banana flesh for presence of pesticides using a GC-MS/MS multiresidue screen (Method ID: TOPS-142)

| Sample | Test | Results |
|---|---|---|
| Banana #1 | Pesticide screen | Detected |
| Banana #1 | Chlorpyrifos | <MQL |
| Banana #1 | Myclobutanil | 0.040 ppm |
| Banana #1 | Azoxystrobin | 0.042 ppm |
| Banana #1 | bifenthrin | <MQL |
| Banana #2 | Pesticide screen | Detected |
| Banana #2 | Chlorpyrifos | 0.011 ppm |
| Banana #2 | Azoxystrobin | 0.0094 ppm |
| Banana #2 | bifenthrin | <MQL |
| Banana #3 | Pesticide screen | Detected |
| Banana #3 | Myclobutanil | 0.089 ppm |
| Banana #3 | Azoxystrobin | 0.034 ppm |
| Banana #3 | bifenthrin | 0.073 ppm |
| Banana (organic #1) | Pesticide screen | Not detected |
| Banana (organic #2) | Pesticide screen | Not detected |
| Banana (organic #3) | Pesticide screen | Detected |

TABLE #2-continued

Results of testing of banana flesh for presence of pesticides using a GC-MS/MS multiresidue screen (Method ID: TOPS-142)

| Sample | Test | Results |
|---|---|---|
| Banana (organic #3) | Tebuconazole | <MDL |
| Banana (organic #3) | chlorpyrifos | <MDL |

Notes:
<MQL = Less than the minimum quantification limit.
<MDL = Less than the minimum detection limit.
Presence of the compound confirmed by GC-MS/MS but at less than the defined quantification or detection limit for that compound using this method.

The third series of testing by LC-MS/MS multiresidue screen (Method ID: TOPS-142) was done to assess the presence of pesticides (as well as their content and identity) in the flesh of the bananas purchased. Table #3 provides a summary of the results from the testing.

TABLE #3

Results of testing of banana flesh for presence of pesticides using a LC-MS/MS multiresidue screen (Method ID: TOPS-142)

| Sample | Test | Results |
|---|---|---|
| Banana #1 | Pesticide screen | Detected |
| Banana #1 | Fenpropimorph | <MQL |
| Banana #1 | Thiabendazole | 0.018 ppm |
| Banana #1 | Fenpropidin | <MDL |
| Banana #2 | Pesticide screen | Detected |
| Banana #2 | Pyriproxyfen | 0.0066 ppm |
| Banana #2 | Fenpropidin | <MDL |
| Banana #2 | Fenpropimorph | <MDL |
| Banana #3 | Pesticide screen | Detected |
| Banana #3 | Pyriproxyfen | 0.13 ppm |
| Banana #3 | Fenpropidin | <MDL |
| Banana #3 | Fenpropimorph | 0.018 ppm |
| Banana #3 | Pyrimethanil | <MDL |
| Banana #3 | Spiroxamine (isomer 1) | <MDL |
| Banana (organic #1) | Pesticide screen | Detected |
| Banana (organic #1) | Fenpropidin | <MDL |
| Banana (organic #1) | Fenpropimorph | 0.0037 ppm |
| Banana (organic #2) | Pesticide screen | Detected |
| Banana (organic #2) | Fenpropidin | <MQL |
| Banana (organic #2) | Fenpropimorph | <MQL |
| Banana (organic #3) | Pesticide screen | Detected |
| Banana (organic #3) | Fenpropidin | <MDL |
| Banana (organic #3) | Fenpropimorph | <MDL |

Notes:
<MQL = Less than the minimum quantification limit.
<MDL = Less than the minimum detection limit.
Presence of the compound confirmed by GC-MS/MS but at less than the defined quantification or detection limit for that compound using this method.

The testing data is a clear indication that despite all of the best efforts deployed, even bananas labelled 'organic' yield fruit which flesh contains pesticide residues. The above testing is proof that a residue-free product, such as a banana has still yet to be achieved on large monocultures as those are prone to infestations of insects, fungus, parasites or the like.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous fungicidal composition consisting of:
Karanj oil in an amount ranging from 1 to 5 wt. %;
fermented aloe vera extracts in an amount ranging from 40 to 60 wt. %;

a lactic acid yielded from bacteria in the fermented aloe vera extracts; and water to act as a solvent for the Karanj oil and fermented aloe extract.

\* \* \* \* \*